United States Patent [19]

Fridman

[11] Patent Number: 4,503,445

[45] Date of Patent: Mar. 5, 1985

[54] PRINTING SYSTEM

[76] Inventor: Robert Fridman, 6502 Park Heights Ave., Baltimore, Md. 21215

[21] Appl. No.: 524,530

[22] Filed: Aug. 19, 1983

[51] Int. Cl.[3] ............................................ G01D 15/24

[52] U.S. Cl. ...................................... 346/141; 346/72; 400/118; 400/121

[58] Field of Search .................. 346/140 R, 141, 33 S, 346/162, 78, 72; 400/118, 121

[56] References Cited

U.S. PATENT DOCUMENTS

| | | | |
|---|---|---|---|
| 2,151,638 | 3/1938 | Genschmer | 346/140 |
| 3,640,214 | 2/1972 | Scheinhutte | 101/45 |
| 4,021,818 | 5/1977 | Van Vloten | 346/140 |
| 4,128,345 | 12/1978 | Brady | 400/120 |
| 4,279,519 | 7/1981 | Shiurila | 400/124 |
| 4,336,544 | 6/1982 | Donald | 346/140 X |

*Primary Examiner*—Joseph W. Hartary
*Attorney, Agent, or Firm*—John F. McClellan, Sr.

[57] ABSTRACT

Pressure transients are used to produce motion for high speed printing of DOTS; in a first embodiment each printing element in an array of printing elements has the form of an angled rigid tube sealed at the ends; one end is fixed, the other end is free to move; the tube is filled with suitable fluid and has two electrodes associated with it and the fluid; a spark across the electrodes on demand produces a pressure transient by expanding the fluid, in turn tending to straighten or otherwise suitably deform the angled tube in a direction advancing the free end for printing; in a second embodiment employing ink as the fluid, a ball point pen arrangement dispenses ink as the second end advances on spark actuation.

11 Claims, 7 Drawing Figures

PRINTING SYSTEM

FIELD OF THE INVENTION

This invention relates generally to printing and specifically to fluid-impulse printers which may be of the DOT type.

BACKGROUND OF THE INVENTION

Various DOT-type devices for printing on surfaces are known, including electromagnetically driven devices, but in relation to the present invention the following U.S. Patents are noted:

U.S. Pat. No. 3,640,214 to H. J. Scheinhutte, 2-8-72, disclosed a printing system in which sparking is used to raise chamber pressure and thereby to eject ink at pre-selectable times and locations;

U.S. Pat. No. 4,128,345 to J. F. Brady, 12-2-78, disclosed a printing system in which tubes are used for selective printing action employing hot air or ink or plunger type pins and pressure change;

U.S. Pat. No. 4,279,519 to Schiurila, 7-21-81, disclosed a system in which ink is ejected at a projection for printing a dot in a matrix.

SUMMARY OF THE INVENTION

According to one aspect of this invention, pre-selectable very high-density very high-speed printing motion in an array of printing elements is achieved by making each element a non-linear or angled chamber or tube with one end portion fixed and the other end portion moved by a spark-induced pressure transient or shock wave in a fluid in the tube. Two embodiments are described. In both embodiments a means for marking associated with the tube is contemplated. In the first embodiment the tube may be a sealed unit and the motion at the end of each tube can produce a mark in the same manner as a dot printing unit. In a second embodiment the tube may be an ink-containing tube terminating in a conventional ball-point pen marking end.

In the second embodiment the printer is equipped with one or more rows of ink-filled tubes, a reservoir damper, conductors, motor, rolls and frame. The bottom ends of tubes are bent toward the center and then down to the ball points. Near the bottom of every tube there are two conductors with a gap between. The ends of both conductors are inside the tube. When a spark jumps across the gap between the two conductors, it creates a pressure impulse inside the tube and the bent end of the tube will move rapidly, if desired, touching the continuously moving paper. Selectively producing electrical impulses on the various tubes causes DOTS which create the images desired.

BRIEF DESCRIPTION OF THE DRAWINGS

The above and other objects and advantages of this invention will become more readily apparent on examination of the following description, including the drawings in which like reference numerals refer to like parts.

DETAILED DESCRIPTION

Figure 1:
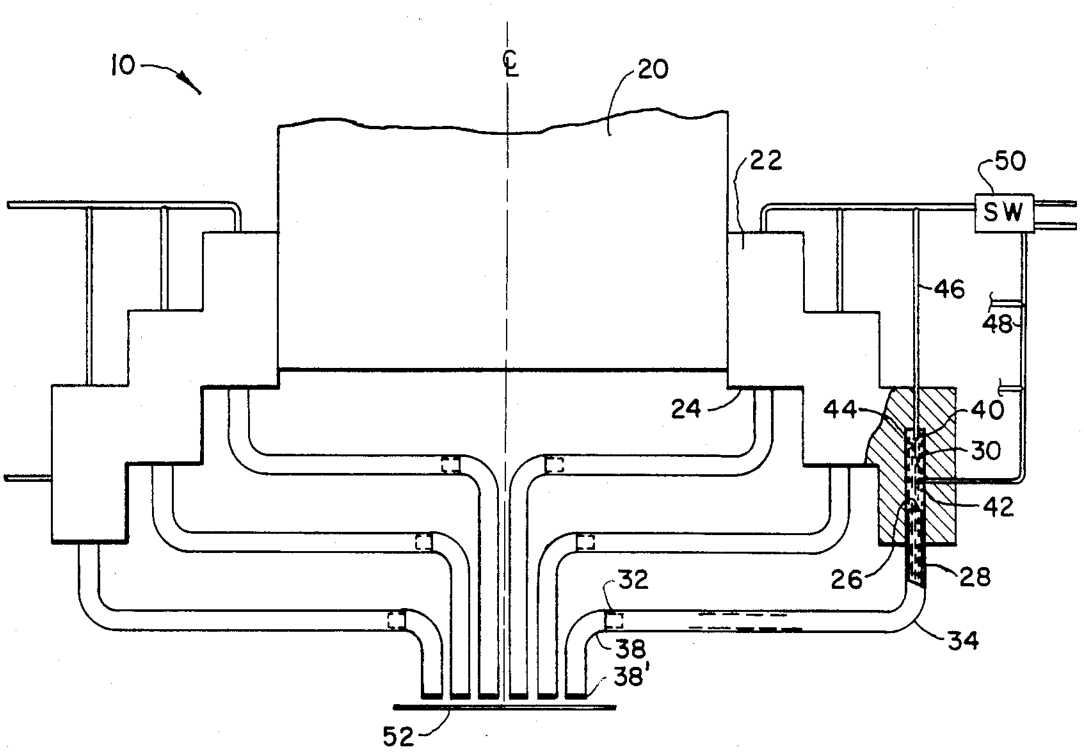
FIG. 1 is a partially broken away elevational detail showing parts of a first embodiment of the invention.

FIG. 1 shows embodiment 10 in fragmentary detail of one in-plane layer, of which there preferably are many.

The construction may be symmetrical about the centerline C-L. Any suitable support 20 holds a base 22 on either side.

Each base 22 may be an internal member with a series of steps 24 offset in height and width.

Each stop 24 securely and hermetically fixes in place a first end 26 of tube 28 in a suitable hole 30 in the step. The hole 30 and the tube bore are in communication.

The second end 32 of the tube is free, and the tube may have angled configuration as follows.

Between the base and the second end there is at least one right-angle bend 34.

The bend may be a gentle curve. Protruding from the second end 32 and turning at right angles to the second end 32 in the same plane but in opposite direction, may be a pin 38.

The terminal portions 38' of the pins in each layer are of different lengths as necessary to compensate for the steps so that the pin ends are all in the same plane. Each hole 30 has, spaced apart, first and second electrodes 40, 42 sealed through the wall of the base and protruding into the fluid 44 filling the tube and hole. Respective wires 46, 48 in the plane of the tubes supply the electrodes with the high voltage electric current necessary to arc across the electrodes when a selector switch 50 is actuated (The stubs indicate connections to other electrodes). The resultant spark produces a pulse of internal pressure that momentarily tends to straighten the tube, somewhat in the manner of Bourdon tube operation. This causes the tube second end 32 to advance slightly out-of-plane with the other ends. By striking the pin end 38' against the paper 52 deployed near it, this provides marking means. Marking may be by ink or by impression or by heat, or by suitable chemical change caused by pressure in conventional manner, pressure being indicated here.

Figure 2:
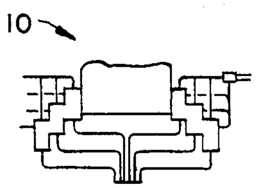
FIG. 2 shows the same view in a smaller scale.

FIG. 2 shows the embodiment 10 in the same view as that of FIG. 1 but in a smaller scale, to indicate the versatility of the design.

Figure 3:
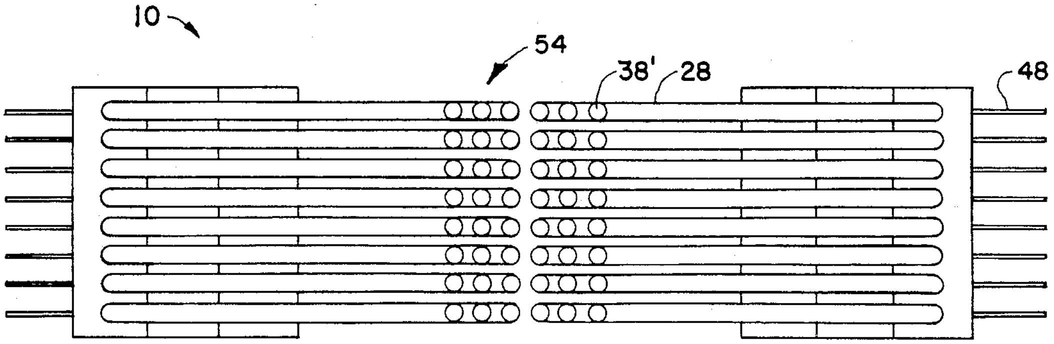
FIG. 3 is a bottom plan view thereof.

FIG. 3 shows that high density packing of the tubes in array 54 is made possible by the in-plane electric lead and tube design. The tubes may be of uniform diameter. Preferably the tube bends are crimped on the inner radius of the bend not closing the tube but producing better motion. Diameters and thicknesses of the parts can be such as to permit tube spacing of 1/32 the tube diameter from the next, a spacing in practice perhaps one millimeter between tubes. Pin ends show at 38'.

Figure 4:
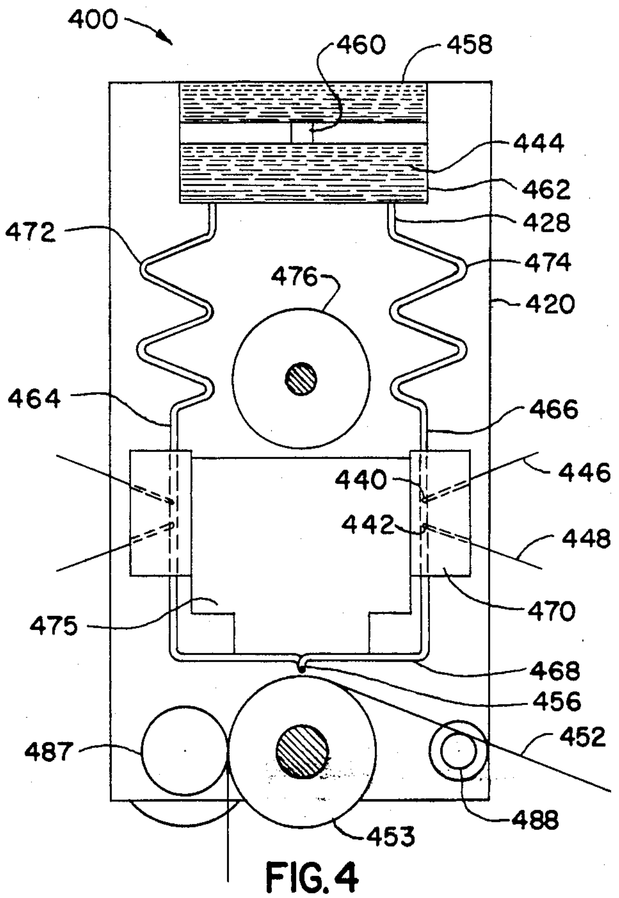
FIG. 4 is a fragmentary, schematic side elevational view adapted from 4—4, FIG. 5 of an assembly according to a second embodiment.
Figure 5:
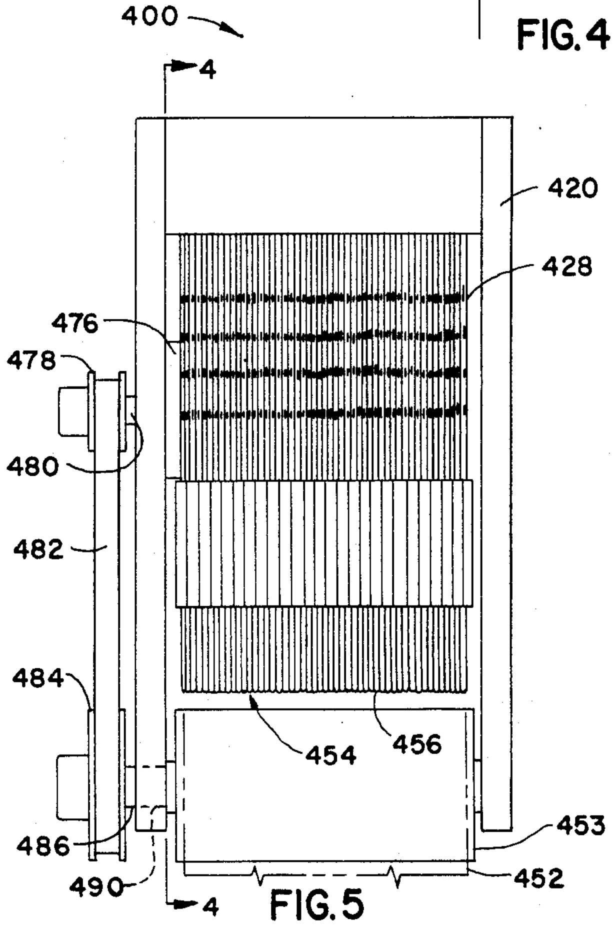
FIG. 5 is an elevational view rotated 90° from the FIG. 4 view.

FIGS. 4 and 5 show a second embodiment 400 of the invention.

This embodiment provides a linear array rather than a rectangular array, ball-point and marks in inking, although the same mechanism can be used for making impressions on the paper if proper spacing is provided.

The linear array 454 (FIG. 5) may comprise a row of identical chambers or tubular elements 428 equipped with respective protrusive nozzles 456 confronting any suitable paper 452 or other web or surface element carried by a roller 453.

Movement of the ends 456 toward the paper is caused by shock waves or pressure pulses in the tubes or tubular elements 428 generated between electrodes.

Electric leads 446, 448 have ends 440, 442 sealed in the tubing bore as spaced electrodes.

The ink 444 acts as the fluid which transmits the pulses and may be replaced at reservoir 458 as through a check valve 460 into header 462 (transparent header indicated) with which the tubular elements communicate.

In this embodiment each of the tubular elements 428 is in the shape of an "L" with the two symmetrically opposed sets having generally parallel upright legs 464, 466 and transverse or base leg as at 468. The upright legs 464, 466 are fixed at the header 462 to the frame 420 of the printing head by clamps 470 molded each leg at the electrode portion and extending outward in-plane.

Each upright leg 464, 466 may have as a flow-resistive path a sinusoidally curved or angled portion 472, 474 of two or three convolutions. The upper ends of the legs may be closer together than the leg parts adjoining the transverse leg portions. The transverse leg portions as at 468 are straight and the marking ball point pen protrusion or nozzle 465 is in the center of the array preferably, and pointing down.

A rubber-like damper 475 fixed on the frame 420 has portions extending along the guides and along the base.

In operation, when a DOT is desired in a particular line of rotation at a particular longitudinal point, the electrodes of a pair 440, 442, for example, which pairs may be connected in parallel, are caused to spark. This tends to deform the "L"-shaped tubing element concerned at the same time, thrusting the marking projection 456 against the paper marking the paper.

Motor 476 through a first pulley 478 on the motor shaft 480, and belt 482, drive a second pulley 484 on the paper roller shaft 486, turning the paper roller in synchronism with action of the printing head by any conventional gating means. Idlers 487 and 488 provide auxiliary support for this. The paper roller may be journalled as at 490 (FIG. 5) in the frame 420.

Matrix switching for suitable electric circuit control in this invention is well known. Voltage employed may be in the range of 100 to 3000 at 10 to 100 milliamps. Tubing material may be steel or PVC. Tubing diameter may be 1 mm I.D. and 1.2 mm O.D. Printing stroke may be 1 to 2 mm. Duration may be as short as $10^{-3}$ seconds, and possible repetition rate may be 1000 per second in a practical embodiment. Base material may be thermoplastic. Epoxy resin may be used for sealing. Fluid may be in the first embodiment "Freon" 13 and in the second embodiment pigmented "Freon" 13.

Figure 6:
FIG. 6 is an elevational detail on an enlarged scale.

FIG. 6 shows one of the ends 456 described in reference to FIG. 3, but on a larger scale. Other ends are behind this one in the view.

Figure 7:
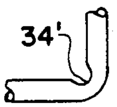
FIG. 7 is an elevational detail on an enlarged scale.

FIG. 7 shows a tubing crimped on the inner radius of a bend 34' as described in reference to FIG. 3.

It will be appreciated that the bends described may be 360° loop bends or bends of any other suitable degree, without departing from the spirit of the invention.

This invention is not to be construed as limited to the particular forms disclosed herein, since these are to be regarded as illustrative rather than restrictive. It is, therefore, to be understood that the invention may be practiced within the scope of the claims otherwise than as specifically described.

What is claimed and desired to be protected by United States Letters Patent is:

1. In a system for printing on a surface marks formed by a DOT system having a plurality of chambers with fluid therein, marking means associated with said chambers, means providing for spark-induced pressure increase in the fluid in said chambers selectively for causing motion making said marking means mark a said surface element, the improvement comprising: each said chamber having an angled configuration, and said spark-induced pressure increase caused motion including motion in a direction towards straightening said angled configuration.

2. In a system as recited in claim 1, each said chamber including a tubular-shape, and said motion including motion of at least a part of said tubular-shape.

3. In a system as recited in claim 2, said system including a frame, means for holding said surface element at said frame, said tubular shape including a closed tube, and means holding at least a portion of said closed tube to said frame.

4. In a system as recited in claim 3, said closed tube having a first end, and said at least a portion of said closed tube being said first end.

5. In a system as recited in claim 1, said angled configuration being a generally "L"-shaped configuration.

6. In a system as recited in claim 1, said angled configuration comprising a first right angle in a first direction, and a pin on said chamber, said pin making second right angle in a second direction and connected with the first right angle.

7. In a system as recited in claim 6, said second right angle being in-plane with the first right angle and in a second direction opposite said first direction.

8. In a system as recited in claim 1, first and second electrodes associated with said chamber for causing said spark induced pressure increase in said fluid.

9. In a system as recited in claim 1, said fluid being a marking fluid.

10. In a system as recited in claim 1, a said chamber including a tubing forming an "L"-shape with base leg and upright leg, each said upright leg including at least one angle portion, said fluid being marking fluid, means for supplying said marking fluid within said tubing, a ball point pen on said base leg for marking upon said spark-induced pressure increase, and each said upright leg having electrode provision for creating a spark therein.

11. In a system as recited in claim 10, and means for damping motion of said base leg.

* * * * *